United States Patent
King

(10) Patent No.: US 9,387,388 B2
(45) Date of Patent: Jul. 12, 2016

(54) ELECTRIC SKATEBOARD

(71) Applicant: REDROCK BOARDSHOP, LLC, Gainesville, FL (US)

(72) Inventor: Aaron M. King, Gainesville, FL (US)

(73) Assignee: REDROCK BOARDSHOP, LLC, Gainesville, FL (US)

( * ) Notice: Subject to any disclaimer, the term of this patent is extended or adjusted under 35 U.S.C. 154(b) by 0 days.

(21) Appl. No.: 13/954,768

(22) Filed: Jul. 30, 2013

(65) Prior Publication Data

US 2014/0027192 A1   Jan. 30, 2014

Related U.S. Application Data

(60) Provisional application No. 61/677,252, filed on Jul. 30, 2012.

(51) Int. Cl.
A63C 17/12 (2006.01)
A63C 17/00 (2006.01)
(Continued)

(52) U.S. Cl.
CPC .............. *A63C 17/12* (2013.01); *A63C 17/0006* (2013.01); *A63C 17/012* (2013.01); *A63C 17/015* (2013.01); *A63C 2203/12* (2013.01); *B60B 37/04* (2013.01)

(58) Field of Classification Search
CPC .... A63C 17/017; A63C 17/015; A63C 17/02; A63C 17/012; A63C 17/223; A63C 17/226; A63C 17/22; B60B 37/04; B60B 37/06
USPC ................ 280/87.042, 87.01, 87.021, 11.19, 280/11.27, 11.28, 81.5, 87.3; 180/181, 180, 180/65.1, 220
See application file for complete search history.

(56) References Cited

U.S. PATENT DOCUMENTS 4,094,372 A * 6/1978 Notter .................... A63C 17/01
                                                                180/181
4,615,640 A * 10/1986 Hosokawa ..................... 403/369
(Continued)

FOREIGN PATENT DOCUMENTS

DE           3 205 379            8/1983

OTHER PUBLICATIONS

Portions of the file history of U.S. Appl. No. 07/452,376 (now U.S. Pat. No. 5,020,621), which was the initial Office Action dated Jul. 16, 2014 with respect to the subject (U.S. Appl. No. 13/954,768).

*Primary Examiner* — Katy M Ebner
*Assistant Examiner* — Emma K Frick
(74) *Attorney, Agent, or Firm* — Saliwanchik, Lloyd & Eisenschenk

(57) ABSTRACT

Embodiments relate to a motorized skateboard. Embodiments allow users to utilize a power supply, such as a rechargeable battery pack, that is remote with respect to the skateboard. Embodiments can have the battery mounted on, under, partially or wholly enclosed within, and/or integral with the skateboard deck. Embodiments can have a removable and interchangeable motor mount, which attaches to the hanger to align the motor with the drive train. The drive wheel adaptor (hub) allows the user to modify standard skateboard wheels to use as drive wheels for the electric skateboard. The strength of the bond between the drive hub and the wheel enables the skateboard to utilize more torque without failure. Embodiments can allow users to have wiring connections at the front and/or back of the skateboard deck. Board-integrated wiring techniques can also be utilized. The electronics can be attached using brackets that fit the industry standard bolt pattern.

15 Claims, 15 Drawing Sheets

(51) Int. Cl.
*B60B 37/04* (2006.01)
*A63C 17/01* (2006.01)

(56) References Cited

U.S. PATENT DOCUMENTS

| | | | | |
|---|---|---|---|---|
| 5,020,621 A | * | 6/1991 | Martin | 180/181 |
| 5,174,680 A | * | 12/1992 | Nakamura et al. | 403/370 |
| 5,381,870 A | | 1/1995 | Kaufman | |
| 5,408,854 A | * | 4/1995 | Chiu | 70/225 |
| 5,893,425 A | * | 4/1999 | Finkle | 180/181 |
| 6,182,779 B1 | * | 2/2001 | Hosoda | A63C 17/12 180/180 |
| 6,467,560 B1 | * | 10/2002 | Anderson | 180/181 |
| 7,900,731 B2 | * | 3/2011 | McKinzie | 180/181 |
| 2004/0163867 A1 | * | 8/2004 | Hillman | 180/180 |
| 2006/0032682 A1 | * | 2/2006 | Hillman et al. | 180/65.1 |
| 2010/0051372 A1 | * | 3/2010 | Adams et al. | 180/181 |

\* cited by examiner

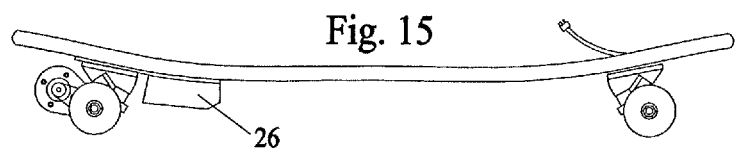
Fig. 15
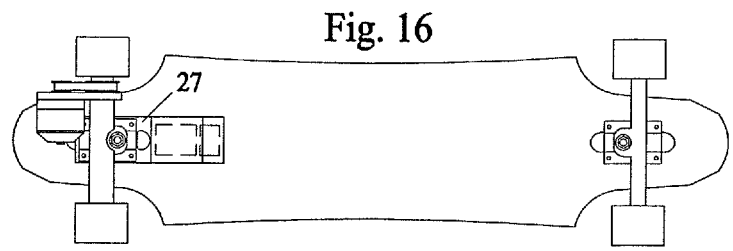
Fig. 16
Fig. 17
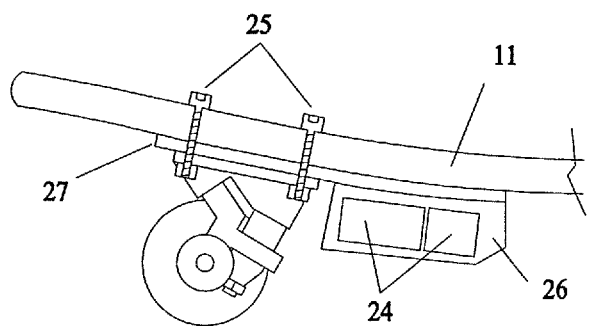
Fig. 18

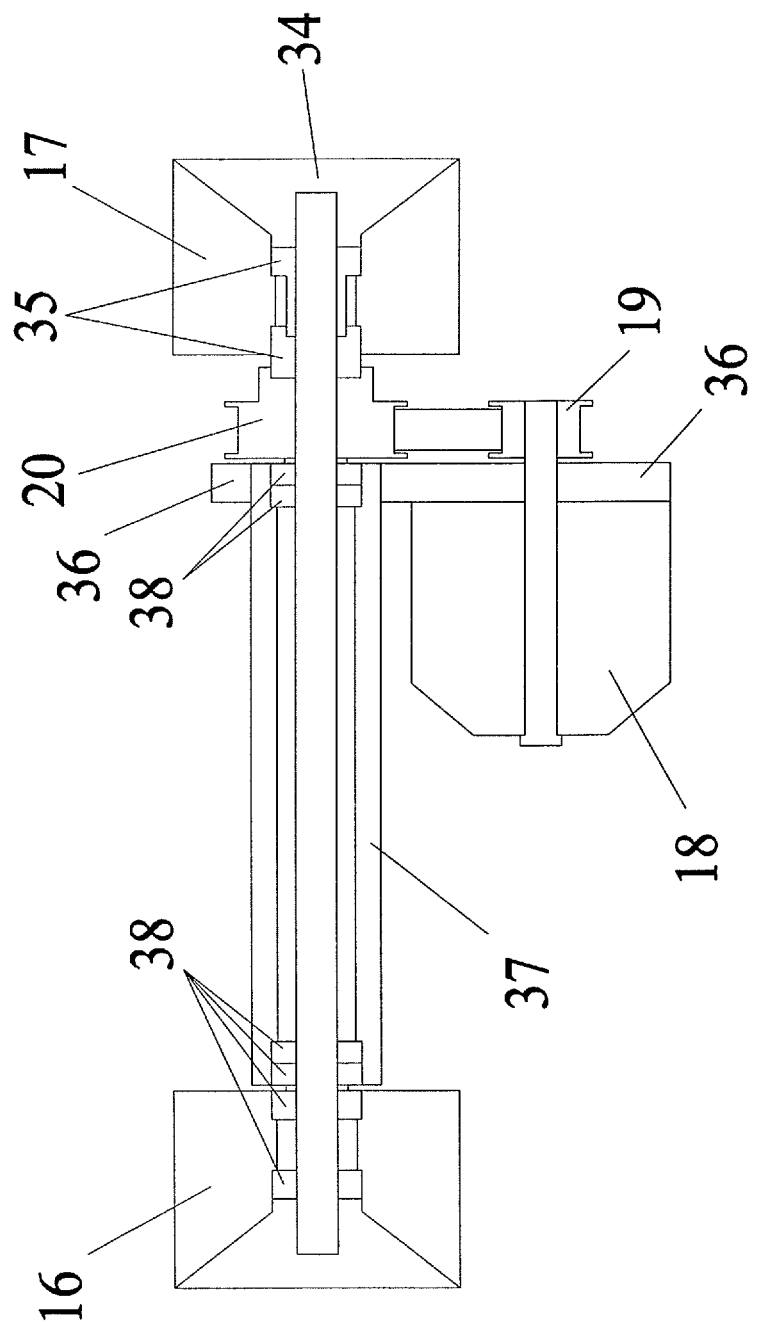

ELECTRIC SKATEBOARD

CROSS-REFERENCE TO RELATED APPLICATION

The present application claims the benefit of U.S. Provisional Application Ser. No. 61/677,252, filed Jul. 30, 2012, which is hereby incorporated by reference herein in its entirety, including any figures, tables, or drawings.

BACKGROUND OF INVENTION

Embodiments of the present invention are in the technical field of land vehicles. Specific embodiments of the present invention pertain to skateboards. Further specific embodiments the present invention relate to motorized skateboards.

BRIEF SUMMARY

Embodiments of the present invention relate to a motorized skateboard. Specific embodiments allow users to utilize a power supply, such as a rechargeable battery pack, that is remote with respect to the skateboard. In a specific embodiment, a user can hold, or otherwise carry, the power supply while riding the skateboard. By locating the battery in a location removed from the skateboard, the handling of the electric skateboard is greatly improved compared to the standard battery-on-board skateboards. Further specific embodiments can have the battery mounted on, under, partially or wholly enclosed within, and/or integral with the skateboard deck.

Specific embodiments of the skateboard can further allow users to have wiring connections at the front and/or back of the skateboard deck. Board-integrated wiring techniques can also be utilized. The skateboard's electronics can be attached using brackets that fit the industry standard bolt pattern, which reduces, or eliminates, the need for modifications to a standard skateboard deck.

Embodiments of the subject skateboard-truck can have a removable and interchangeable motor mount, which attaches to the hanger to align the motor with the drive train. The drive wheel adaptor (hub) allows the user to modify standard skateboard wheels to use as drive wheels for the electric skateboard. The strength of the bond between the drive hub and the wheel enables the skateboard to utilize more torque without failure. The truck and electronics brackets can also be designed to allow a user to lock up their equipment securely.

BRIEF DESCRIPTION OF DRAWINGS

FIG. 15 is a side view of a skateboard deck with a bottom-mount bolt-on electronics housing.

FIG. 16 is a bottom view of a skateboard deck with a bottom-mount bolt-on electronics housing.

FIG. 17 is a top view of a skateboard deck with a bottom-mount bolt-on electronics housing.

FIG. 18 is a section view of a bottom-mount bolt-on electronics housing mounted to a skateboard deck.

FIG. 22 is a section view of a floating-axle truck of a specific embodiment of the present invention.

DETAILED DISCLOSURE

Figure 1:
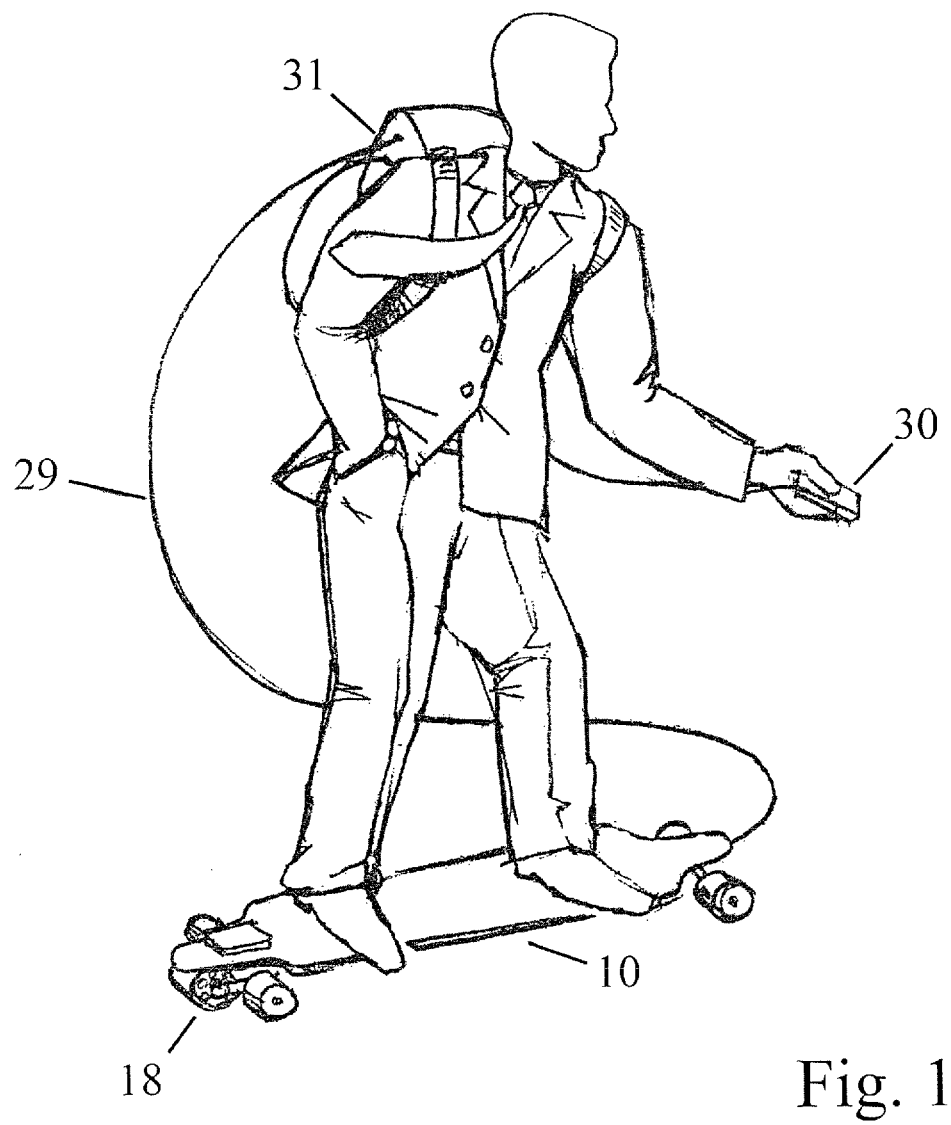
FIG. 1 is a perspective view of a motorized skateboard of a specific embodiment of the present invention.

Referring to FIG. 1 there is shown an embodiment of a motorized skateboard with a remote power supply 31. A power cord 29 connects the skateboard 10 to the remote power supply 31. The board can be controlled by a wired remote or wireless remote 30. The motor 18 is used as a means to drive the wheels and propel the skateboard. In a specific embodiment, the motor 18 can also be used to brake the skateboard. In a specific embodiment, the battery pack can be carried in a backpack. In other embodiments, the rider can attach the battery pack to a belt, other item of clothing, carry the battery pack due to gravity holding the battery pack to the rider's body (such as a vest or necklace type structure), use leg bands and/or armbands, or use other structures for allowing the battery pack to be carried by the rider. In other embodiments, smaller battery packs can be mounted to the deck, truck, electronics bracket, or other location on the skateboard. Having an on-board battery(s) can simplify operation for the rider and can also be used to supplement, or take the place of, remotely-carried batteries. Embodiments of the motorized skateboard can incorporate the use of other power sources, such as, but not limited to, a fuel cell or combustion engine.

Figure 2:
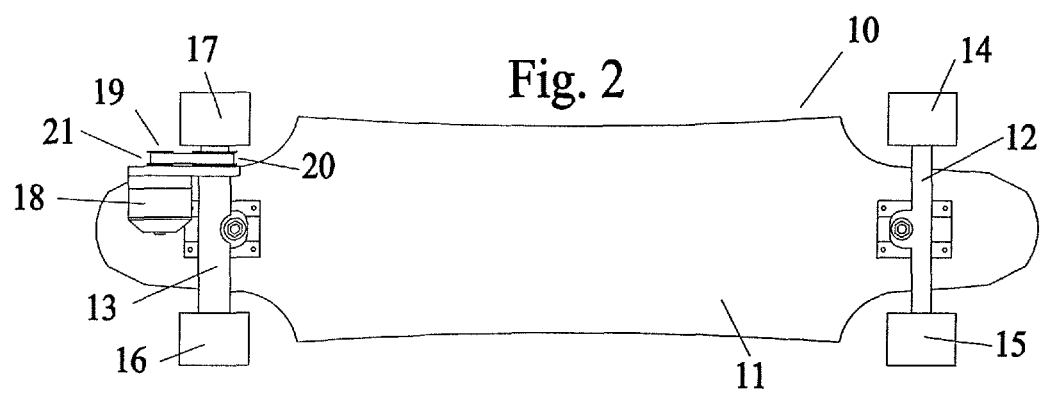
FIG. 2 is a bottom view of a motorized skateboard of a specific embodiment of the present invention.
Figure 3:
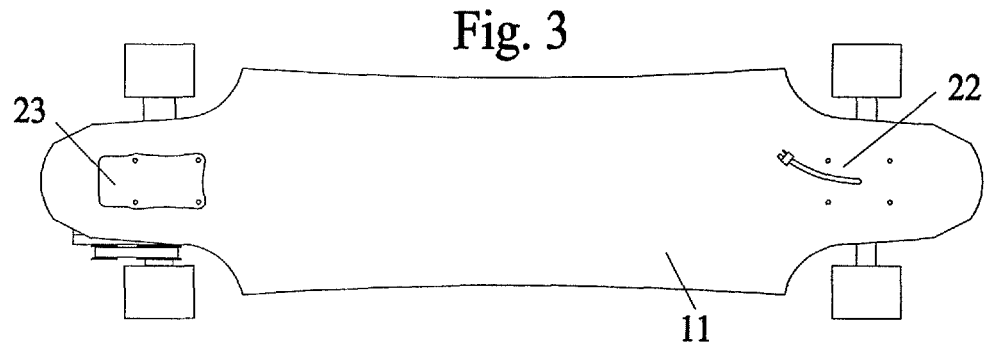
FIG. 3 is a top view of the motorized skateboard of FIG. 2.
Figure 4:
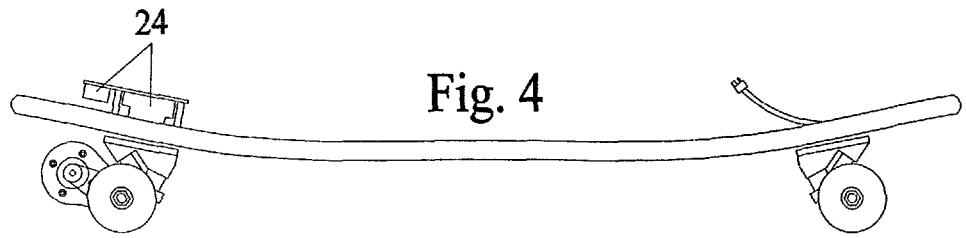
FIG. 4 is a side view of the motorized skateboard of FIG. 2.

Referring to FIG. 2-4, there is shown an embodiment of a motorized skateboard 10 having a riding platform 11 having two skate trucks attached, a front truck 12, a rear truck 13. Each truck can have a truck plate, a hanger, a bushing, a kingpin that connects the hanger, bushing, and truck plate together, and an axle housed in the hanger. Connected to each skate truck are two wheels, front right wheel 14, front left wheel 15, rear left wheel 16, rear right wheel/drive wheel 17. Attached to the rear truck is a motor 18. Preferably, the motor is attached in parallel to the rear truck. Specific embodiments attach the motor to the hanger of the truck and, preferably, with the axle of the motor parallel to the axle housed in the hanger. In alternative embodiments, the motor 18 can be attached to the platform 11. The motorized truck can be installed on the front of a board, the back of a board, or on both the front and the back of a board. Either the right wheel, the left wheel, or both wheels of each motorized truck can be driven. In the embodiment of FIGS. 2-4, the shaft of the motor has an attached pulley 19 that rotates on the same axis as the motor. The motor axis and pulley axis are parallel with the axis of the wheel. In other embodiments, the motor can be operated with the motor axis at various angles with respect to the axis of the wheel, and/or the axis of the pulley can be non-coaxial with the motor axis, such as by the use of various gears and/or drive shafts known in the art. The motor pulley 19 drives a belt 21 that runs between the rear truck 13 and motor 18. The belt 21 turns the drive pulley 20. The drive pulley 20 then turns the drive wheel 17 by means of an interlocking drive wheel hub. In another embodiment, the drive hub's features can be built into the wheel's design to eliminate the use of an interlocking drive hub. Additional embodiments can utilize alternative interconnections to transfer the power of the motor to the rear truck, such as one or more gears, chains, or other linkages, and can also, optionally use one or more clutches. Further embodiments, where the drive pulley is fixed to the truck axle and the wheel drive hub is fixed to the wheel and to the truck axle, rotate the wheel by rotating the truck axle by rotating the drive pulley and then the rotation of the truck axle rotates the wheel.

Referring to FIG. 3, there is shown an electronic cable 22 at the front of the deck, or platform, 11. The cable runs the length of the board, front to back. The cable can be, for example, integrated with the board, positioned partially or wholly in a groove in the board, or interconnected to other electrical conductors positioned in the board, on the board, or attached to the board. This cable allows for several options for battery connections and component locations. Also, mounted to the top of the deck 11 is the top mount electronics bracket 23.

Referring to FIG. 4, there is shown the electronics 24 that are housed by the electronics bracket 23. In a specific embodiment, the electronics 24 include a receiver/input for user commands. Electronics 24 can also include an electronic speed control and/or one or more battery pack. The preferred embodiment has a speed controller with advanced programming features accessed through a radio system, linked cable (USB, etc.), or other interface. The speed controller's settings can include adjustments (e.g., fine adjustments) and/or settings to account for different components and rider preferences, such as torque limits, brake limits, torque curves, brake curves, speed limits, battery type, and motor settings.

Figure 5:
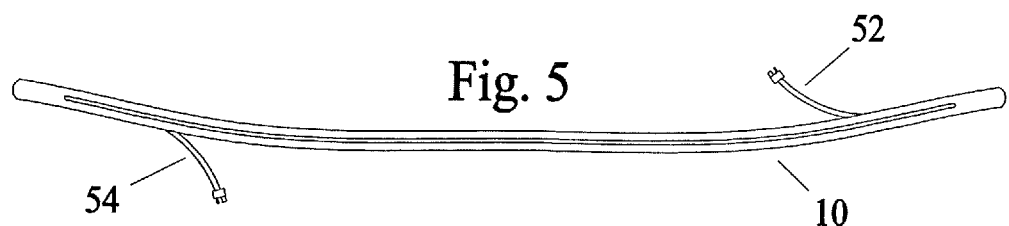
FIG. 5 is a side view of a skateboard deck with integrated wire.
Figure 6:
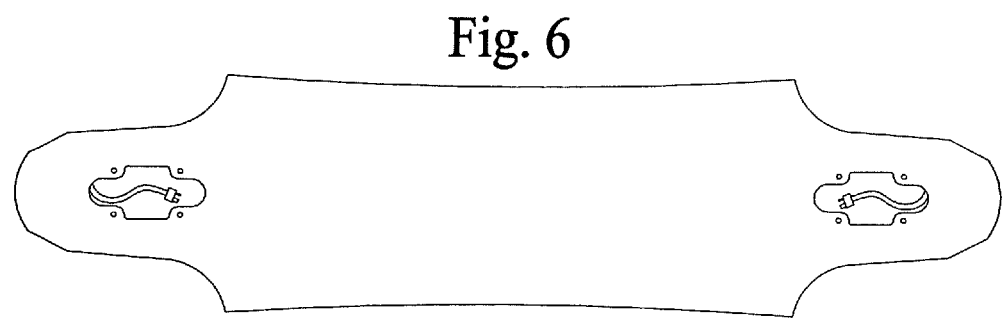
FIG. 6 is a top and/or bottom view of a skateboard deck with integrated wire.
Figure 7:
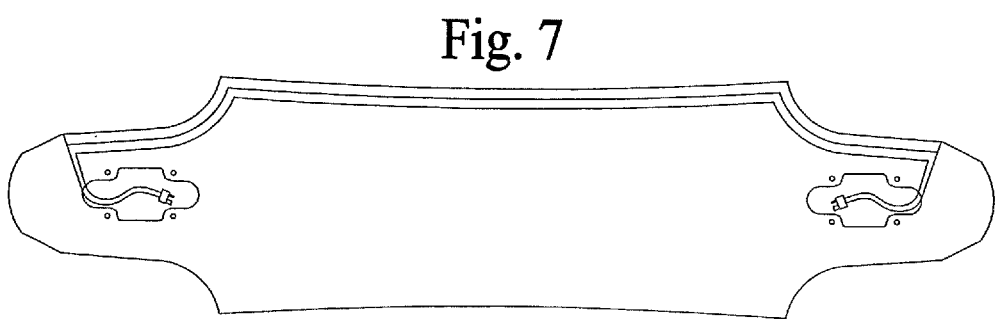
FIG. 7 is a section view of a skateboard deck with integrated wire.
Figure 8:
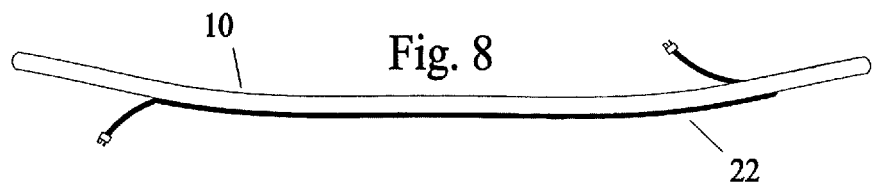
FIG. 8 is a side view of a skateboard deck with an exposed wire attached.
Figure 9:
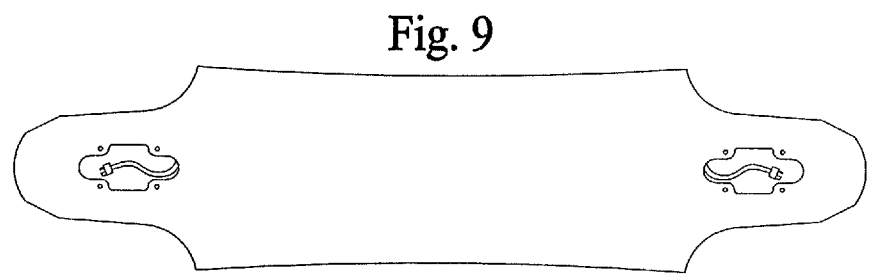
FIG. 9 is a top view of a skateboard deck with an exposed wire attached.
Figure 10:
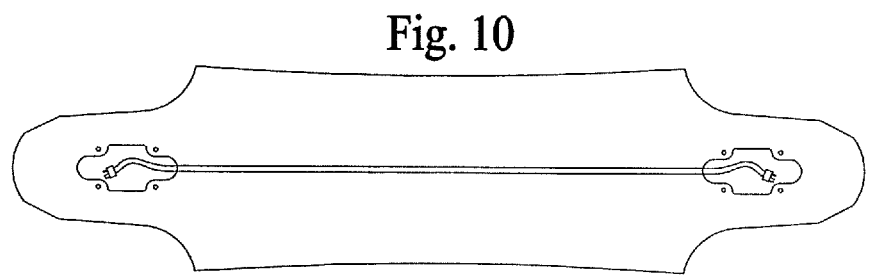
FIG. 10 is a bottom view of a skateboard deck with an exposed wire attached.
Figure 11:
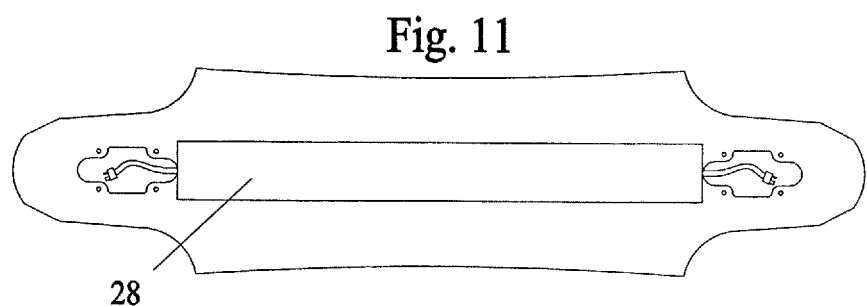
FIG. 11 is a bottom view of a skateboard deck with a protectant wire cover attached.

Referring to FIG. 5-7, there is shown an embodiment of a deck 11 with an electronic cable 22 integrated with the deck material. Wires, conductive material, conduit, and circuitry can be integrated with the skateboard deck during its initial construction or installed afterwards. These wires can supply power, motor pulses, and other electrical signals from one end of the board to the other. Also shown is a front connection lead 52 and a rear connection lead 54.

Referring to FIG. 8-11, there is shown an embodiment of a deck 11 with an electronic cable 22 running along the lower surface of the deck 11. The cable 22 can optionally be covered with a guard 28. In other embodiments, the wiring can be along the top or sides of the board and can be set partially or fully set in grooves to minimize or eliminate any raised surfaces.

Figure 12:
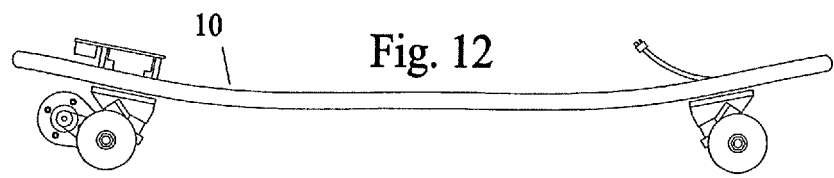
FIG. 12 is a side view of a skateboard deck with a top-mount bolt-on electronics housing.
Figure 13:
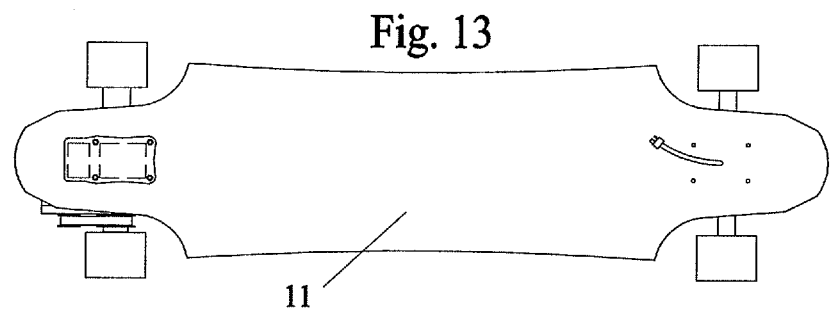
FIG. 13 is a top view of a skateboard deck with a top-mount bolt-on electronics housing.
Figure 14:
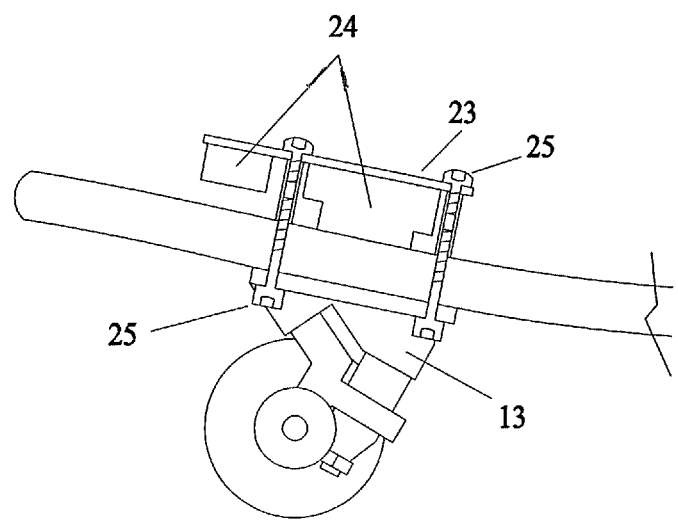
FIG. 14 is a section view of a top-mount bolt-on electronics housing mounted to a skateboard deck.

Referring to FIG. 12-14, there is shown an embodiment of a motorized skateboard 10 with the electronics bracket 23 mounted to the top of the deck. The electronics bracket 23 houses the electronics 24 and is mounted to the top of the deck 11 with bolts 25 that secure the truck 13 to the deck 11 as well as the electronics bracket 23. The bracket can be open or enclosed and can be mounted on either the front, back, or both ends of the board.

Referring to FIG. 15-18, there is shown an embodiment of an electric skateboard with a bottom-mounted electronics bracket 26. The bottom-mounted electronics bracket 26 protects the electronics 24. In a specific embodiment, the bottom-mounted electronics bracket 26 is secured to a mounting plate 27. Alternatively, the bottom-mounted electronics bracket 26 can be secured to the deck 11. The mounting plate is attached to the board with the same bolts 25 that secure the truck 13 to the deck 11. The bracket can be open or enclosed and can be mounted on either the front, back, or both ends of the board.

Figure 19A:
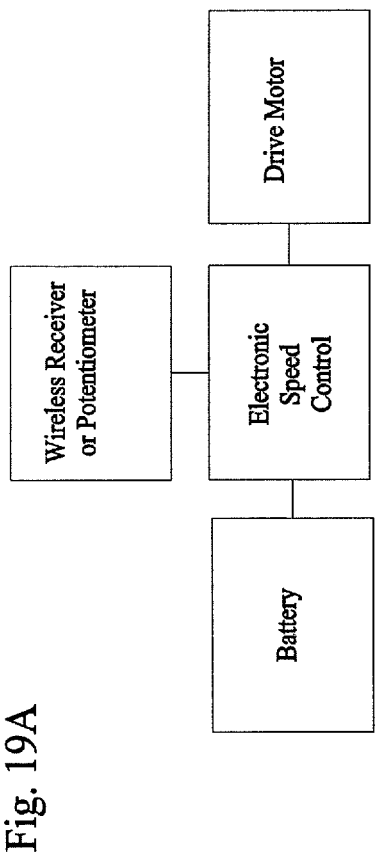
FIG. 19A is a wiring diagram of the electronics for a motorized skateboard in accordance with a specific embodiment of the subject invention.
Figure 19B:
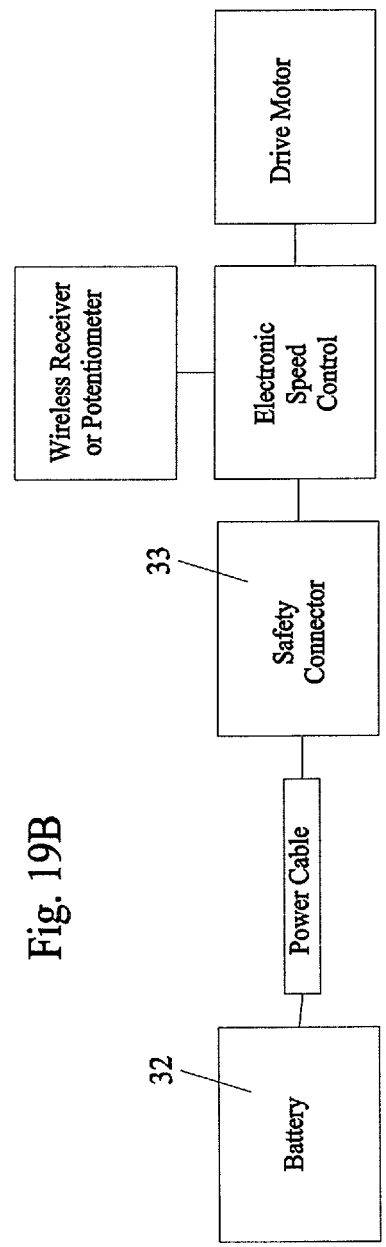
FIG. 19B is a wiring diagram of the electronics for a motorized skateboard in accordance with a specific embodiment of the subject invention.
Figure 19C:
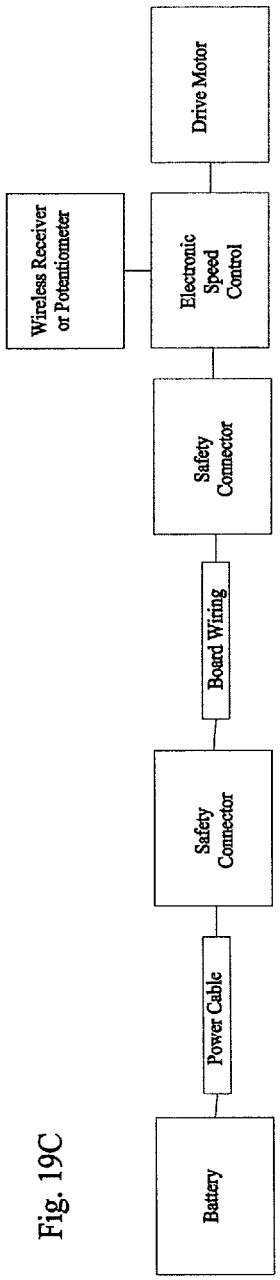
FIG. 19C is a wiring diagram of the electronics for a motorized skateboard in accordance with a specific embodiment of the subject invention.
Figure 19D:
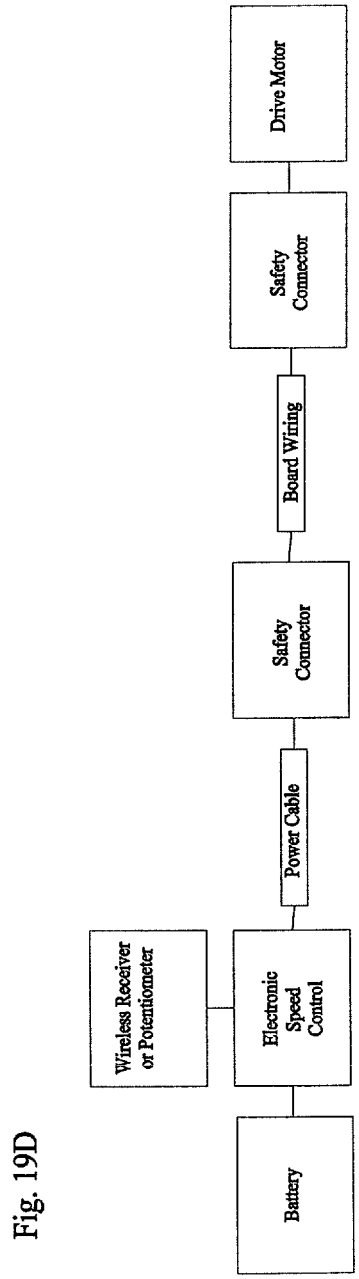
FIG. 19D is a wiring diagram of the electronics for a motorized skateboard in accordance with a specific embodiment of the subject invention.

Referring to FIG. 19A-19D, there are shown diagrams of the electronics that can be utilized in specific embodiments. Other interconnection schemes can also be used. These figures help to illustrate a few key embodiments and demonstrate the variety of component and power connection locations that are possible. FIG. 19A shows a diagram for a "bare bones" electrical system for a skateboard of a specific embodiment. Referring to FIG. 19B, In a specific embodiment, the rider carries the battery 32 and connects it through a power cable to the board at the safety connector 33. The safety connector 33 disconnects the battery from the board automatically if the rider leaves the board. This lowers the risk of damage to both the rider and the equipment. Other automatic shut off apparatus can be utilized to de-energize the motor, as desired, such as a pressure detector that detects when the rider is off the board. FIG. 19C shows a specific (and preferred) embodiment where the board has integrated wiring with safety connectors at each end. This allows for battery connection at the front or the back of the board. Additionally, the interchangeable aspect of this system allows for placement of electronic components in various locations and arrangements. Other embodiments include board-mounted batteries (including multiple batteries). FIG. 19D shows a specific embodiment in which the board wiring is used to connect the motor to the electronic speed control (ESC). In other embodiments, multiple motors can be powered and controlled by shared or separate electronic components.

Figure 20:
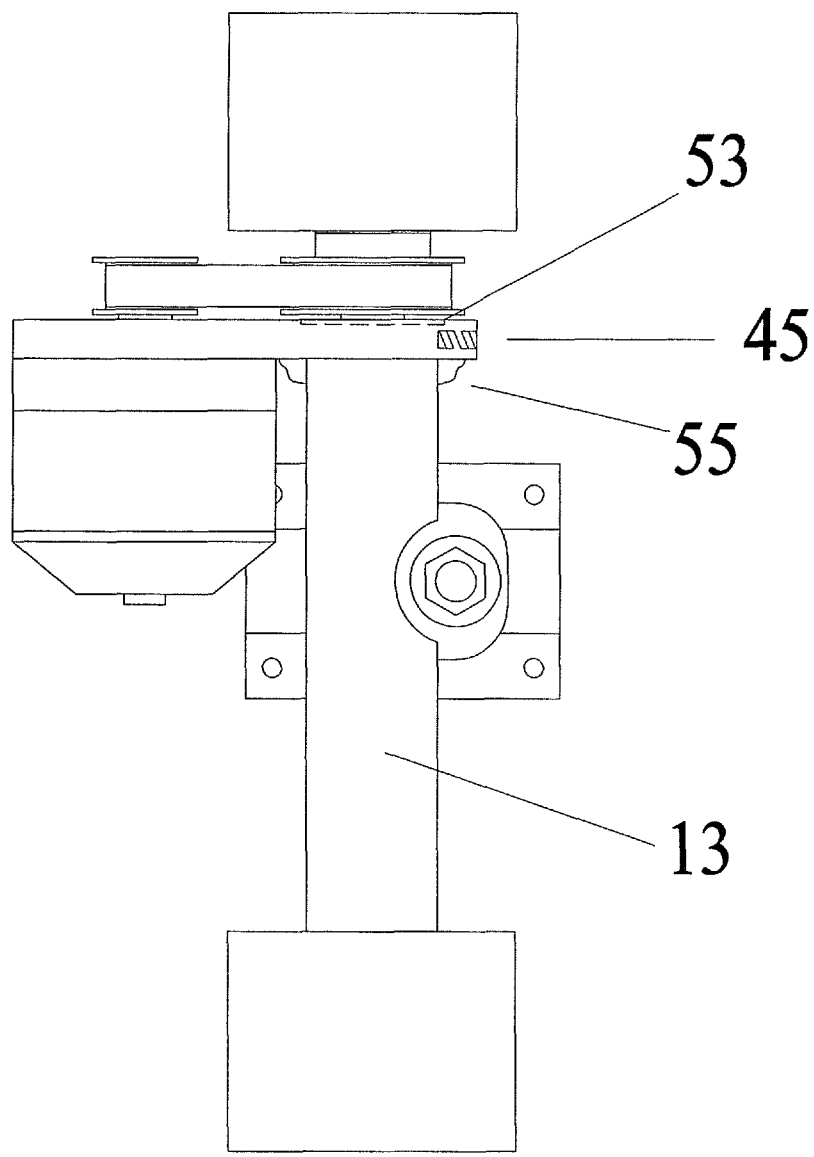
FIG. 20 is a bottom view of an electric skateboard truck of a specific embodiment of the present invention.
Figure 21A:
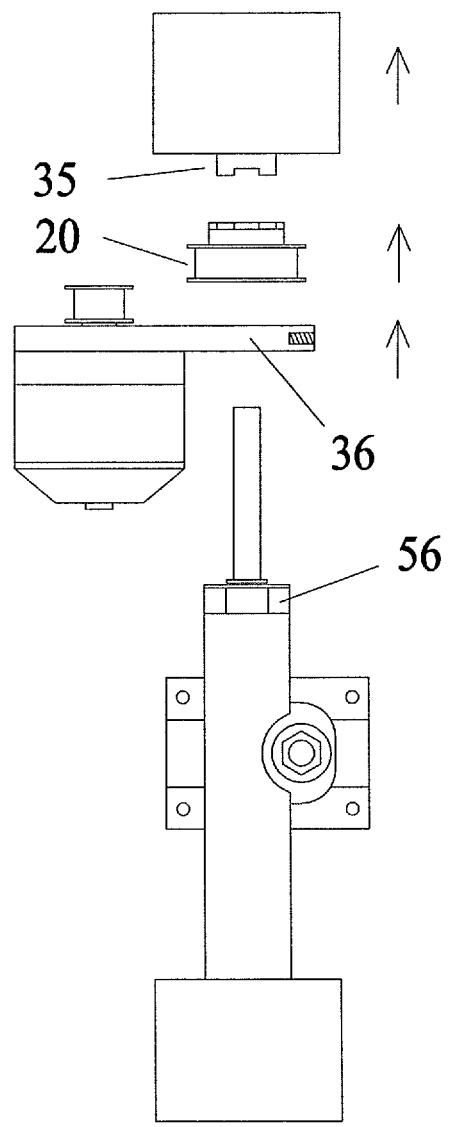
FIG. 21A is an exploded bottom view of an electric skateboard truck of a specific embodiment of the present invention.
Figure 21B:
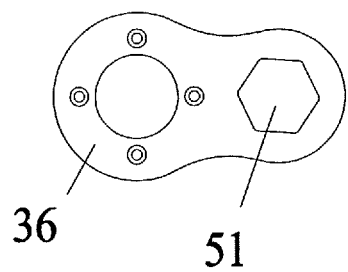
FIG. 21B is a view of a motor mount in accordance with a specific embodiment of the subject invention.

Referring to FIG. 20, FIG. 21A, and FIG. 21B, there is shown an embodiment utilizing a floating-axle truck 13 with a removable motor mount 36. "Floating-axle" refers to any skate axle that rotates on bearings in the same motion as the wheel. The motor mount can be held in place by a snap ring 53 and further secured by a setscrew 45. If preferred, a bead of weld 55 can permanently fix the mount to the truck 13, such as to the hanger of the truck. Alternatively, the motor mount can be bolted onto the hanger directly. In the embodiment of FIG. 20 and FIGS. 21A-B, the end 56 of the hanger and the motor mount 36 have corresponding geometry, such as a hexagon shape 51 shown in FIG. 21B, to align the motor mount with respect to the hanger and to resist rotational forces such that the motor mount and hanger do not rotate with respect to each other. The angle of the motor mount, with respect to the hanger, can be set to any degree by modifying the design of the motor mount's corresponding geometry. In a specific embodiment, not shown, the motor mount can incorporate an adjustable, e.g., rotatable, aperture through which the end of, or other portion of, the hanger interconnects with the motor mount, where the rotation of the adjustable aperture can be fixed at a desired position. The motor mount can be rotated with respect to the hanger to a position where the motor is on the other side of the hanger. This style of motor mount can be used for solid-axle or floating-axle skateboard trucks. Enough room is available on each truck to allow for dual-motors. Specific embodiments can utilize dual motors. In alternative embodiments, the motor mount interconnects with another portion of the hanger. In a further embodiment, a coupler (not shown) can interconnect with the hanger, such that the coupler and hanger do not rotate with respect to each other about the axis of the hanger, and then the motor mount can interconnect with the coupler to prevent rotation of the motor with respect to the hanger.

Referring to FIG. 22, there is shown an embodiment utilizing a floating-axle truck 37. Again, "floating-axle" refers to any skate axle that rotates on bearings in the same motion as the wheel. A motor mount 36 is attached to the truck's hanger 37. The end of the drive pulley 20 interlocks with the keyed drive hub 35. The drive hub 35 is fixed to the inner portion of wheel 17 nearest the motor. The drive pulley 20 is fixed to the axle 34, which makes adjusting the axle nut easier. In alternative embodiments the interconnection of the drive pulley to the axle can allow "slippage", such as by the use of a clutch or torque based mechanism that allows the pulley and the axle to rotate with respect to each other (e.g., an attachment element can mount to the axle and a clutch can interconnect the drive pulley to the attachment element). In still further embodiments, the drive pulley and axle can be free to rotate with each other and can, optionally, incorporate bearings (not shown). In a further embodiment, the interconnection of the drive hub 35 and the drive pulley can incorporate a clutch in a similar manner as described for the interconnection of the drive pulley and axle. The floating axle is supported in the truck by bearings 38 at both ends of the floating axle truck. The floating axle design can also be adapted to drive both wheels simultaneously and/or differentially.

Figure 23:
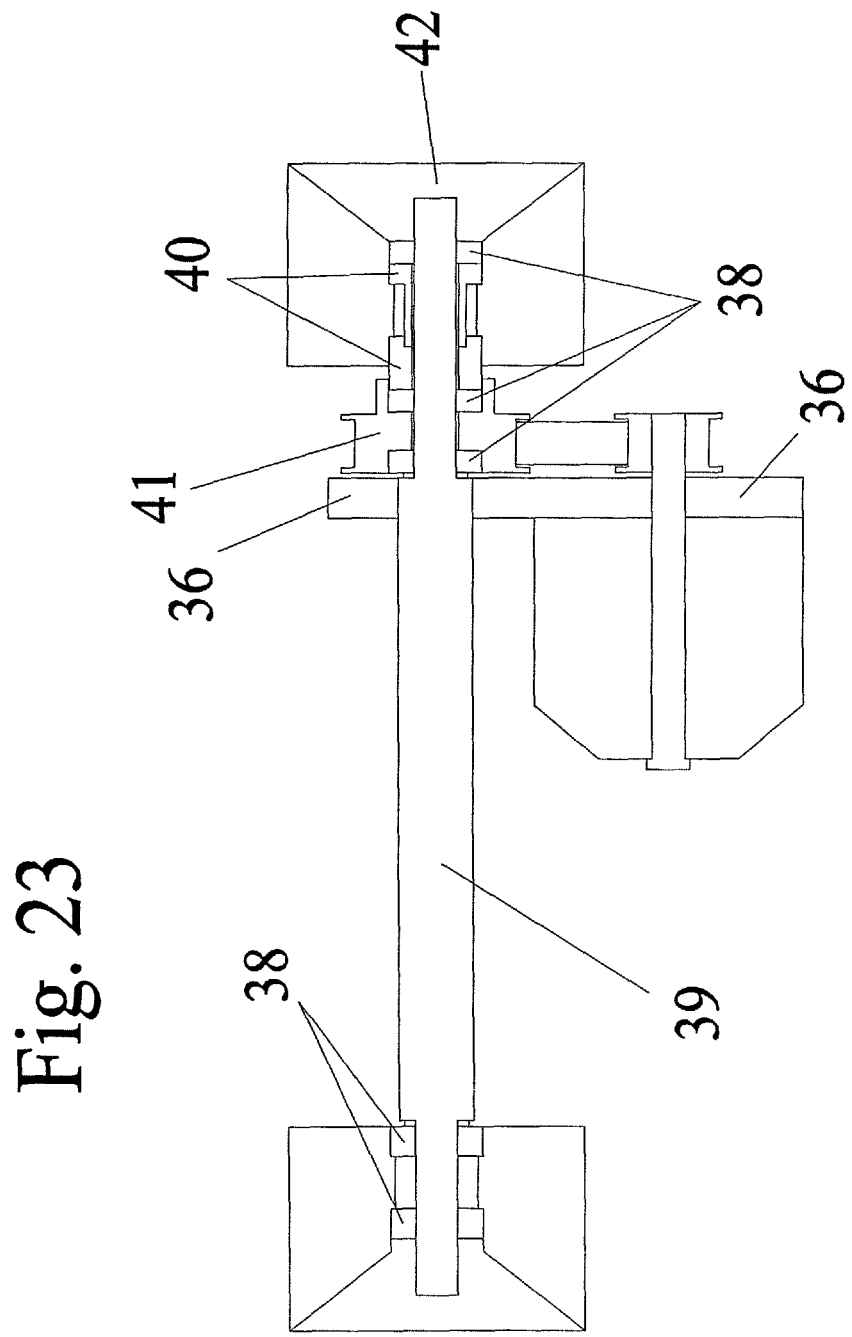
FIG. 23 is a section view of a solid-axle truck of a specific embodiment of the present invention.

Referring to FIG. 23, there is shown an embodiment utilizing a solid-axle truck. "Solid-axle" refers to any skate axle that allows the wheel to rotate around it. The solid axle 42 in FIG. 23 is fixed in position with respect to the hanger such that the axle does not rotate with respect to the hanger. The solid-axle truck utilizes a drive pulley with bearings 41. The drive pulley with bearings 41 interlocks with the keyed drive hub with bearings 40. On the solid axle truck 39 the drive pulley with bearings 41 and the drive hub with bearings 40 rotate around the stationary axle 42. In another embodiment, the drive pulley with bearings has specific geometry to engage with a bearing-mounted skateboard wheel.

Figure 24:
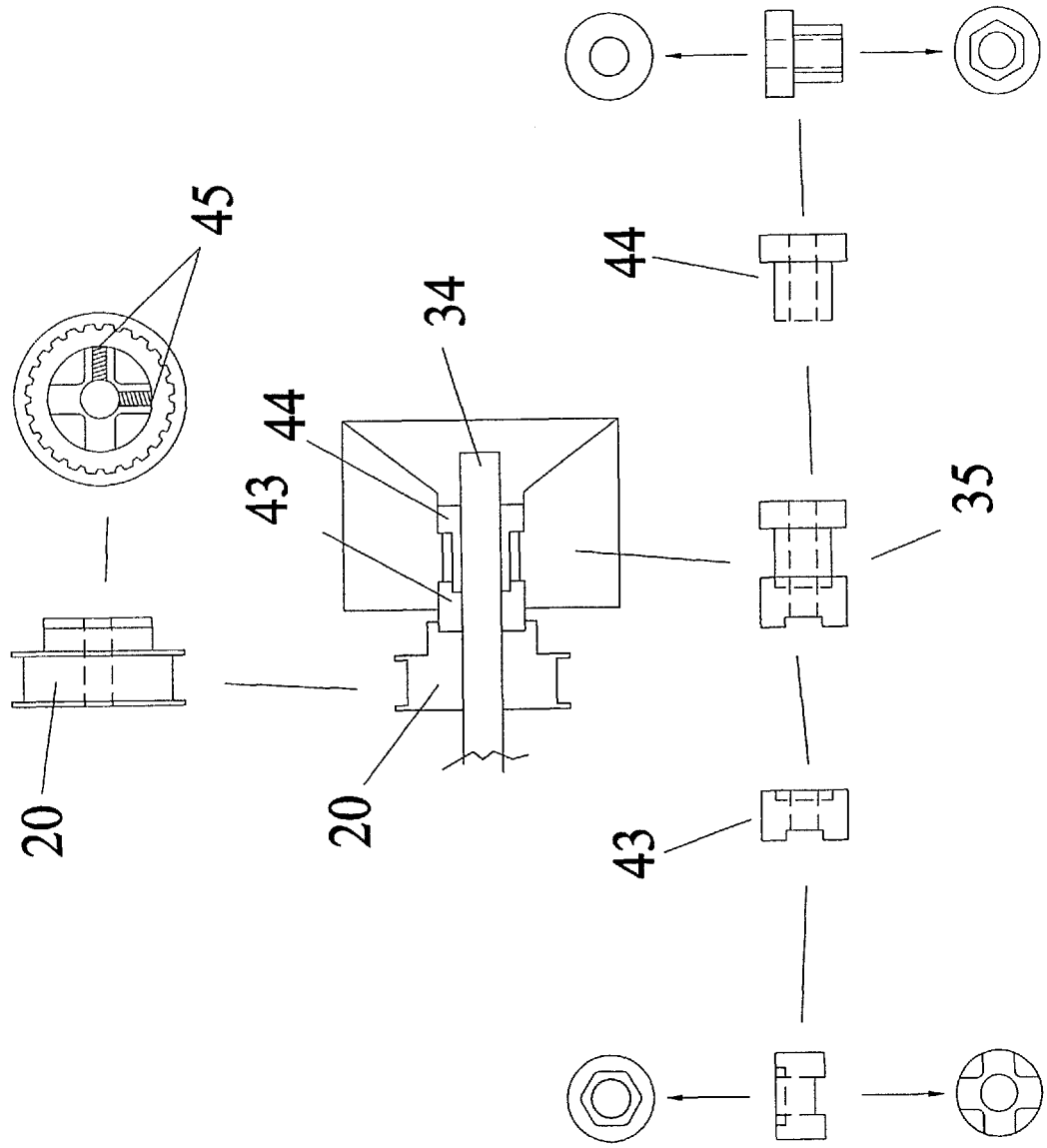
FIG. 24 is an exploded section view of a floating-axle wheel hub in accordance with a specific embodiment of the subject invention.

Referring to FIG. 24, there is shown a wheel hub for a floating-axle truck. The drive hub 35 is a two part assembly: a female end 43 and a male end 44. FIG. 24 shows an embodiment of a hub assembly with hexagonally shaped interactions that transfer torque to the wheel via the female end and the male end such that the torque is distributed to both sides of the wheel. The hub's interlocking shapes can be different than those shown. In a specific embodiment, the drive pulley can be integrated with the female end such that the male end interconnects directly with the drive pulley. The hub interlocks with the drive pulley 20. The shape of the interaction between the drive pulley and drive hub can be varied. The drive pulley 20 is fixed to the floating axle 34 by two setscrews 45 as seen in FIG. 24, or can be fixed by other means, such as collet action or keyed parts to lock the sprocket to the axle. Locking the sprocket to the axle allows for two-wheel-drive applications and aids in convenient removal and adjustment of the axle nut. The hubs can be fixed to the wheel through means of, for example, collet-type radial force, splines, and/or adhesive. In another embodiment, the drive hub and/or the drive pulley has specific geometry to directly engage with a skateboard wheel's features. In a specific embodiment, the drive pulley can rotate freely with respect to the axle, for example via bearings, and rely on the engagement with the wheel drive hub, or the wheel's features, to rotate the wheel.

Figure 25:
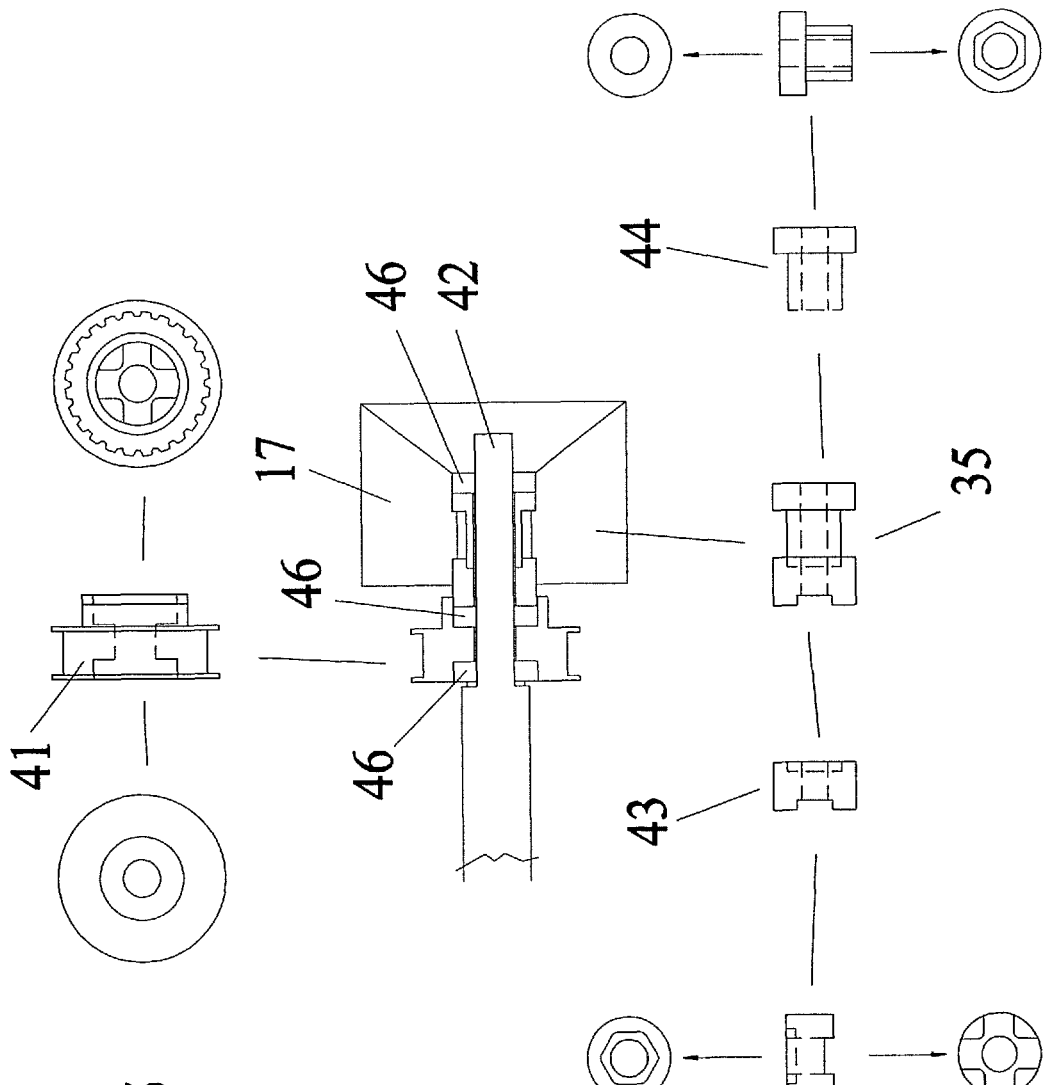
FIG. 25 is an exploded section view of a solid-axle wheel hub in accordance with a specific embodiment of the subject invention.

Referring to FIG. 25, there is shown an embodiment of a wheel hub for a solid-axle truck. The drive hub 35 is a two part assembly: a female end 43 and a male end 44. The drive hub 35 interlocks with the drive pulley 41. The drive pulley 41 is suspended by bearings 46 on the solid axle 42. The hubs can be fixed to the wheel through, for example, a collet-type radial force, splines, and/or adhesive. Alternatively, the male end 44 may be replaced with a bearing if the interaction between the female hub and the wheel has adequate radial shear resistance. In a specific embodiment, the drive pulley can rotate freely with respect to the axle, for example via bearings, and rely on the engagement with the wheel drive hub, or the wheel's features, to rotate the wheel.

Figure 26:
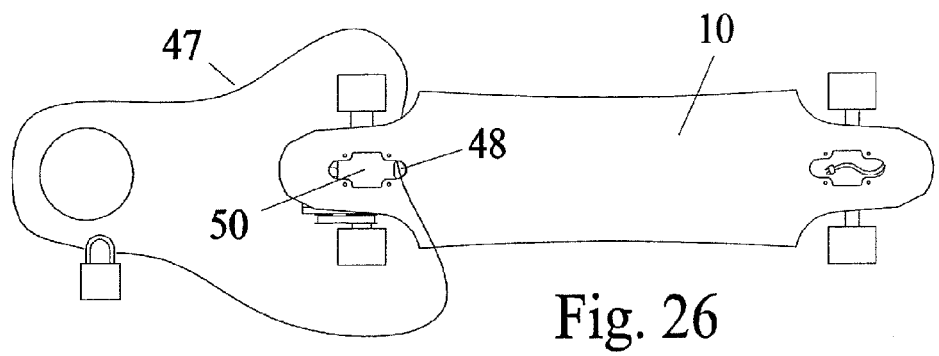
FIG. 26 is a top view of a skateboard with a lockable truck.

Referring to FIG. 26, there is shown an embodiment of a lockable truck. The truck has a lock pass-thru hole 48, which is a common hole through the base plate 50, deck and/or electronics bracket. A security cable 47 can be threaded or pushed through the lock pass-thru hole 48 to secure the skateboard 10 to another object. Chains, U-locks, specialized racks, and other types of locking equipment can be used instead of the security cable as long as it can fit through the pass-thru hole or attached to another structure that can fit through the pass-thru hole.

Figure 27:
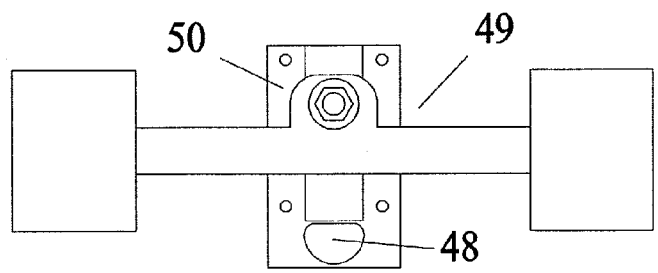
FIG. 27 is a bottom view of a lockable skate truck.

Referring to FIG. 27, there is shown an embodiment of a lockable truck. The lock pass-thru hole 48 is in the base plate 50 of the truck 49.

Figure 28:
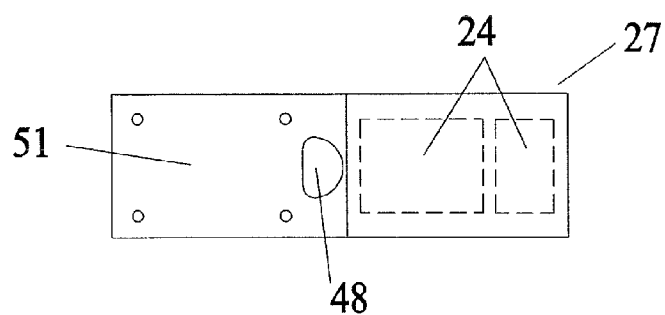
FIG. 28 is a bottom view of a lockable electronics mounting plate.

Referring to FIG. 28, there is shown an embodiment of a lockable electronics bracket 27 with a lock pass-thru hole 48.

Embodiments of the invention pertain to kits including components to motorize a skateboard, which can be used to motorize an existing skateboard by replacing one or more parts and adding one or more parts, or to motorize a skateboard being originally assembled. Kits in accordance with embodiments of the invention can incorporate two or more parts from the group consisting of: motor mount, motor pulley, drive pulley, truck axle, hanger, truck bushing, truck base plate, belt or other linkage between motor pulley and drive pulley, electronics bracket, power cord, wheel drive hub, and battery pack. A specific embodiment of a kit can include a motor mount and drive pulley. The drive pulley can be configured to interconnect with features of a desired wheel to rotate the wheel and/or be configured to be secured to the skateboard axle or rotate free around the axle. The kit can further include a wheel drive hub that is configured to engage with a desired wheel. The wheel drive hub can be configured to engage with the drive pulley so as to be rotated by the drive pulley or not engage with the drive pulley. The wheel drive hub can be configured to mount securely on the axle such that the wheel does not rotate with respect to the axle or the wheel drive hub may be free to rotate with respect to the axle (and may incorporate bearings). The kit may also include a mechanism, such as a belt, chain, or other linkage, to interconnect the drive pulley to a motor pulley or other coupler connected to a motor axle such that the drive pulley is rotated as the motor rotates.

An embodiment of the kit can also include a motor pulley or other coupler for interconnecting the motor axle to the drive pulley via, for example, a belt, linkage, or other mechanism for rotating the drive pulley as the motor axle rotates. An embodiment of the kit may also include a motor that is configured to be mounted by the motor mount and drive the wheel through the other components of the kit and skateboard parts.

Embodiments of the kit can also include a hanger configured to interconnect with a track plate, bushing, and kingpin of a truck. Embodiments of the kit can also include an axle configured to be housed in a hanger and engage with the motor mount and drive pulley. Embodiments of the kit can also include en electronics mounting bracket for mounting electronics to control a motor for causing the wheel of the skateboard to rotate. Embodiments of the kit can also include a power cord for interconnecting a battery pack and the electronics for controlling the motor.

While the foregoing written description of the invention enables one of ordinary skill to make and use various embodiments of the subject invention, those of ordinary skill will understand and appreciate the existence of variations, combinations, and equivalents of the described embodiments, methods, and examples herein. The invention should therefore not be limited by the above described embodiments, methods, and examples, but by all embodiments and methods within the scope and spirit of the invention.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCE NUMBERS 10 skateboard
11 riding platform/deck
12 front truck
13 rear truck
14 front right wheel
15 front left wheel
16 rear left wheel
17 rear right wheel/drive wheel
18 motor
19 pulley
20 drive pulley
21 belt
22 electronic cable
23 top mount electronics bracket
24 electronics
25 bolts
26 bottom-mounted electronics bracket
27 mounting plate
28 guard
29 power cord
30 wired remote or wireless remote
31 remote power supply
32 battery
33 safety connector
34 floating axle
35 keyed drive hub
36 removable motor mount
37 hanger
38 bearings
39 solid axle truck
40 drive hub with bearings
41 drive pulley with bearings
42 solid axle
43 female end
44 male end
45 parts
46 bearings
47 security cable
48 lock pass-thru hole
49 truck
50 base plate
51 hexagonal shape
52 front connection lead
53 snap ring
54 rear connection lead
55 bead of weld
56 end of hanger

The invention claimed is:

1. An assembly for motorizing a skateboard, comprising:
a motor mount,
where the motor mount is configured to connect to a motor housing of a motor having a motor drive axle, and connect to a hanger of a truck connected to a deck of a skateboard via a baseplate of the truck, such that the motor is held in position with respect to the hanger by the motor mount and the motor mount prevents rotation of the motor housing with respect to the hanger when the motor drive axle rotates,
wherein the truck has a bushing and a kingpin such that the kingpin connects the hanger, bushing, and baseplate together such that the hanger is moveable with respect to the baseplate and the hanger is moveable with respect to the deck, and
wherein a skateboard axle passes through the hanger;
a drive pulley,
wherein the drive pulley is configured to be positioned such that the drive pulley surrounds the skateboard axle;
a drive wheel hub,
wherein the drive wheel hub is configured to be positioned such that at least a portion of the drive wheel hub surrounds the skateboard axle and the drive wheel hub interconnects with a skateboard wheel, such that at least a portion of the skateboard wheel surrounds at least a portion of the drive wheel hub, the skateboard wheel rotates about an axis of the skateboard axle when the drive wheel hub rotates about the axis of the skateboard axle and the skateboard wheel only rotates about the axis of the skateboard axle when the drive wheel hub rotates about the axis of the skateboard axle; and
a torque transfer mechanism,
wherein the torque transfer mechanism is configured to interconnect with the motor drive axle, interconnect with the drive pulley, and transfer torque from the motor drive axle to the drive pulley when the motor drive axle rotates, such that when the torque transfer mechanism is interconnected with the motor drive axle, interconnected with the drive pulley, and the motor drive axle rotates, the drive pulley rotates, wherein when the torque transfer mechanism is interconnected with the motor drive axle, interconnected with the drive pulley, and the motor drive axle does not rotate, the drive pulley does not rotate, wherein the drive pulley and the drive wheel hub are configured to be positioned such that the drive pulley, the drive wheel hub, and the skateboard wheel rotate about the axis of the skateboard axle when the torque transfer mechanism rotates the drive pulley, and when torque is transferred from the motor drive axle to the drive pulley, torque is transferred from the drive pulley to the drive wheel hub via direct physical contact between the drive pulley and the drive wheel hub, and torque is transferred from the drive wheel hub to the skateboard wheel, and wherein the drive pulley interconnects with the drive wheel hub, such that when the drive pulley is rotated by the torque transfer mechanism, the drive pulley rotates the drive wheel hub, and the drive wheel hub only rotates about the axis of the skateboard axle when the drive pulley rotates about the axis of the skateboard axle.

2. The assembly according to claim 1,
wherein the torque transfer mechanism comprises:
a motor pulley,
wherein the motor pulley is configured to connect to the motor drive axle of the motor; and
a pulley coupler,
wherein the pulley coupler is configured to couple the motor pulley to the drive pulley such that when the motor drive axle rotates, the motor pulley rotates, and the pulley coupler transfers torque from the motor drive axle to the drive pulley.

3. The assembly according to claim 2,
wherein the pulley coupler is a belt.

4. A motorized skateboard, comprising:
a deck;
a truck,
wherein the truck comprises a baseplate, a bushing, a kingpin, and a hanger,
wherein the baseplate is connected to the deck, and
wherein the kingpin connects the hanger, bushing, and baseplate together such that the hanger is moveable with respect to the baseplate and the hanger is moveable with respect to the deck;
a skateboard axle,
wherein the skateboard axle passes through the hanger,
wherein the skateboard axle moves with respect to the baseplate when the hanger moves with respect to the baseplate, and
wherein the skateboard axle moves with respect to the deck when the hanger moves with respect to the deck;
a motor,
wherein the motor comprises a motor housing and a motor drive axle;
a motor mount,
wherein the motor mount is connected to the hanger and the motor is connected to the motor mount such that the motor is held in position with respect to the hanger by the motor mount and the motor mount prevents rotation of the motor housing with respect to the hanger when the motor drive axle rotates;
a skateboard wheel positioned with respect to the skateboard axle such that at least a portion of the skateboard wheel surrounds the skateboard axle;
a drive pulley,
wherein the drive pulley is positioned such that the drive pulley surrounds the skateboard axle;
a drive wheel hub,
wherein the drive wheel hub is positioned such that at least a portion of the drive wheel hub surrounds the skateboard axle, and
wherein the drive wheel hub interconnects with the skateboard wheel, such that at least a portion of the skateboard wheel surrounds at least a portion of the drive wheel hub, the skateboard wheel rotates about an axis of the skateboard axle when the drive wheel hub rotates about the axis of the skateboard axle, and the skateboard wheel only rotates about the axis of the skateboard axle when the drive wheel hub rotates about the axis of the skateboard axle;
a torque transfer mechanism,
wherein the torque transfer mechanism interconnects with the motor drive axle, interconnects with the drive pulley, and transfers torque from the motor drive axle to the drive pulley when the motor drive axle rotates, such that when the torque transfer mechanism is interconnected with the motor drive axle, interconnected with the drive pulley, and the motor drive axle rotates, the drive pulley rotates, wherein when the torque transfer mechanism is interconnected with the motor drive axle, interconnected with the drive pulley, and the motor drive axle does not rotate, the drive pulley does not rotate, wherein the drive pulley, the drive wheel hub, and the skateboard wheel rotate about the axis of the skateboard axle when the motor drive axle rotates, wherein when torque is transferred from the motor drive axle to the drive pulley, torque is transferred from the drive pulley to the drive wheel hub via direct physical contact between the drive pulley and the drive wheel hub, and torque is transferred from the drive wheel hub to the skateboard wheel, and wherein the drive pulley interconnects with the drive wheel hub, such that when the drive pulley is rotated by the toque transfer mechanism, the drive pulley rotates the drive wheel hub, and the drive wheel hub only rotates about the axis of the skateboard axle when the drive pulley rotates about the axis of the skateboard axle.

5. The skateboard according to claim 4, further comprising:
a power source,
wherein the power source supplies power to the motor, and
wherein the power source is remote from the skateboard, wherein the power source is interconnected to the motor via a power cord.

6. The skateboard according to claim 5,
wherein the power source is selected from the group consisting of: a battery, a fuel cell, and a combustion engine.

7. The skateboard according to claim 4,
wherein the drive pulley is fixed with respect to the skateboard axle such that the drive pulley does not rotate with respect to the skateboard axle about the axis of the skateboard axle, and
wherein the skateboard axle rotates with respect to the hanger about the axis of the skateboard axle when the motor drive axle rotates.

8. The skateboard according to claim 4,
wherein the drive wheel hub is integrated into the skateboard wheel.

9. The skateboard according to claim 4,
wherein the drive pulley forms a portion of the drive wheel hub.

10. The skateboard according to claim 4,
wherein the drive wheel hub comprises a first end inserted from a first side of the skateboard wheel such that the drive pulley transfers torque to the drive wheel hub by transferring torque to the first end, and wherein the first end transfers torque to the skateboard wheel when the motor drive axle rotates.

11. The skateboard according to claim 10,
wherein the drive wheel hub further comprises a second end inserted from a second side of the skateboard wheel so as to interconnect with the first end such that when the drive pulley transfers torque to the first end, the first end transfers torque to the second end such that the torque transferred to the skateboard wheel from the drive wheel hub is distributed to both the first side and second side of the skateboard wheel.

12. The skateboard according to claim 4,
wherein an engaging portion of the drive wheel hub has an outer cross-sectional shape that engages with a corresponding inner cross-sectional shape of an engaging portion of the skateboard wheel such that the engagement of the engaging portion of the drive wheel hub with the engaging portion of the skateboard wheel transfers torque from the drive wheel hub to the skateboard wheel when the motor drive axle rotates.

13. The skateboard according to claim 4,
wherein the drive wheel hub is fixed to the skateboard wheel via a collet-type radial force, splines, or adhesive.

14. The skateboard according to claim 4,
wherein the skateboard axle is rotatable with respect to the hanger about the axis of the skateboard axle.

15. The skateboard according to claim 4,
wherein the drive pulley is fixed with respect to the skateboard axle such that the drive pulley does not rotate with respect to the skateboard axle about the axis of the skateboard axle.

* * * * *